United States Patent [19]

Edwards et al.

[11] Patent Number: 5,557,780
[45] Date of Patent: Sep. 17, 1996

[54] ELECTRONIC DATA INTERCHANGE SYSTEM FOR MANAGING NON-STANDARD DATA

[75] Inventors: Allan T. Edwards, Weiser; Rebecca K. Shirrod, Boise; Robin L. Callahan, Middleton, all of Id.

[73] Assignee: Micron Technology, Inc., Boise, Id.

[21] Appl. No.: 426,469

[22] Filed: Apr. 20, 1995

Related U.S. Application Data

[63] Continuation of Ser. No. 245,887, May 18, 1994, which is a continuation of Ser. No. 876,755, Apr. 30, 1992, abandoned.

[51] Int. Cl.⁶ .................................................. G06F 17/28
[52] U.S. Cl. .................... 395/500; 395/200.01; 395/600; 364/401 R; 364/DIG. 1; 364/ DIG. 2
[58] Field of Search .................................... 395/500, 200, 395/600; 364/401

[56] References Cited

U.S. PATENT DOCUMENTS

| | | | |
|---|---|---|---|
| 4,677,552 | 6/1987 | Sibley, Jr. | 364/408 |
| 4,799,156 | 1/1989 | Shavit | 364/401 |
| 4,807,228 | 2/1989 | Dahbura et al. | |
| 4,951,196 | 8/1990 | Jackson | 364/401 |
| 5,038,284 | 8/1991 | Kramer | 364/408 |
| 5,063,507 | 11/1991 | Lindsey et al. | 364/408 |
| 5,163,091 | 11/1992 | Graziano et al. | 380/25 |
| 5,202,977 | 4/1993 | Pasetes, Jr. et al. | 395/500 |
| 5,283,887 | 2/1994 | Zachery | 395/500 |
| 5,337,360 | 8/1994 | Fischer | 380/23 |
| 5,341,379 | 8/1994 | Cresp | 371/6 |
| 5,367,664 | 11/1994 | Magill et al. | 395/575 |
| 5,410,675 | 4/1995 | Shreve et al. | 395/500 |
| 5,440,432 | 8/1995 | Aoki | 360/32 |

FOREIGN PATENT DOCUMENTS

| | | | |
|---|---|---|---|
| 1489572 | 10/1977 | United Kingdom | 364/408 |
| 1489574 | 10/1977 | United Kingdom | 364/408 |

OTHER PUBLICATIONS

Message management systems: Concepts, motivations, and Strategic effects by Kimbrough et al., JMIS v9n2 pp. 29–52, Fall 1992.

Electronic Data Interchange, IEEE publication 1990, By Ir. Coen M. A. Kreuvels.

The Development of an EDI System By B. K. Blacleor, IEEE publication, Sep. 1991.

UN/EDIFACT Directory, Version 90.1, *Standard Messages and Directories* (Data Interchange Standards Association, 1990).

*Primary Examiner*—Krisna Lim
*Assistant Examiner*—Zarni Maung
*Attorney, Agent, or Firm*—Hopkins, Roden, Crockett, Hansen & Hoopes

[57] ABSTRACT

A programmable machine system and method for performing electronic data interchange among two or more trading partners. The machine is programmed so that it can accept any format of EDI data so long as the incoming data stream is composed of data segments and elements conforming to some EDI Standard format. The system can further convert and store incoming EDI data to an internal format for maintenance and application within other management information subsystems. Further, the system can re-compile the EDI data into the originator's format and retransmit the data. Importantly, the system does not require any previously agreed upon exchange format or data template in order to receive, store, maintain, and retransmit EDI structured-data.

15 Claims, 16 Drawing Sheets

ELECTRONIC DATA INTERCHANGE SYSTEM FOR MANAGING NON-STANDARD DATA

CROSS REFERENCE TO RELATED APPLICATIONS

This is a continuation of U.S. patent application Ser. No. 08/245,887, filed May 18, 1994, which is a continuation of U.S. patent application Ser. No. 07/876,755, filed Apr. 30, 1992, now abandoned.

BACKGROUND OF THE INVENTION

The standard definition of Electronic Data Interchange, or EDI, is "the automated computer-to-computer exchange of structured business documents, between an enterprise and its vendors, customers, or other trading partners." The form of these documents is based on the use of industry, national, and international standards.

Traditionally, an application (or person) generates a paper document, on a multi-part form. This is routed for approval signatures. Copies are forwarded to various internal departments for filing, while one or more copies are sent through the postal service and/or FAX to a trading partner (customer, vendor or other).

When the document reaches the trading partner, it's routed to and re-entered into another system. Here, errors often creep into the data. Paper documents are generated, and the data transfer process begins in reverse. Often this cycle can take as many as ten working days.

Clearly, this antiquated method cannot possibly keep pace with the information transfer requirements of current trading mechanisms. Here is where EDI comes in to play. EDI automates the transfer processes between computers-no matter the make, model, creed or color of those machines, and regardless of their physical location.

Of course, these systems must have "rules." The data cannot be just any data. Formats must agree. Data is structured; assembled in a way that makes it recognizable to both the sending and receiving computers. Business documents usually transferred electronically are grouped into "transaction sets". These include invoices, payment orders, price lists, RFQs, purchase orders, acknowledgements, shipping notices, and change requests, to name just a few.

The existence of heterogeneous computing environments necessitates standards for data interchange. EDI standards are meant to solve three basic issues:

The structure for the message envelope that surrounds the data to be transmitted;

The structure for the message content-the actual data, and;

The vehicle to handle the links to external computers through communications protocol conversion.

The Message Envelope

Like regular mail, EDI requires that the data transmitted over a network from one trading partner to another be sent in an envelope. Regardless of the EDI standards to which a company subscribes, most message envelopes must begin with a header segment message and end with a trailer segment message. Essentially, these take the place of the "Mail To" address in electronic mail message envelopes also contain a code to identify at the highest level what type of data is contained.

Message envelopes are defined by most if not all EDI standards, including ANSI X12, EDIFACT, TDCC, and others. Message standards are also used with electronic mail in standards such as the CCITT X.400 series of internationally recognized messaging recommendations.

The Message Content

In addition to the message envelope, EDI transmissions have content data. This data usually consists of a stream of data segments and data elements which can include purchase-order numbers, terms and conditions, and bill-to and ship-to fields. Also, the content of the message envelope is structured on EDI standards to which all trading partners agree.

External Computer Links

Communications standards are required to transport the EDI envelopes from one trading partner to another. These communications protocols are standardized to be able to support not only EDI documents and data, but most forms of electronic information distribution. The protocols include X.25, the international standard for packet switching networks; 2780/3780, a data communications associated with batch processing, also known as bisynchronous communication; and others.

The Problem

To facilitate EDI structured-data transactions, both the customer and vendor must have computer systems enabled with facilities to send and receive electronic data. Furthermore, these facilities must be able to determine the format and content of these electronic "messages" pursuant to EDI standards as previously discussed. The solution to date has been for vendors and vendees (trading partners) to first reach an agreement on the version of EDI standards they will adhere to, and then determine a format for which data should appear to each party for each class of transaction and type of electronic document, such as a purchase order, and order acknowledgement, a change order, and the like.

Prior art relies on the existence of a pre-defined "template" which describes the format and nature of the incoming data in terms of records and fields. Such things as the EDI standard format version must be set out. The order and limitations with which records, segments, and elements are packaged must be defined within the template. However, if incoming data fails to conform to the template, the transaction fails and an error condition results. Accordingly, the prior art lacks in two respects. First, should a transaction data stream fail to either transmit data in the order expected, or transmit the structure according to a template established for the sender, the entire transaction is aborted, requiring a new transmittal.

Secondly, in order to allow electronic transmission of transactions, a template must first be created. This additional overhead slows the transaction at large, and can in some cases as a practical matter, cancel a "deal" between vendor and yendee where the transaction is extremely price-sensitive. For example, suppose the vendor would like to effect a major transaction involving commodity priced material. If in order to consummate the transaction (i.e., accept the order into vendor's sales transaction system), the yendee and vendor must create a "template" to accept order data from the yendee, the transaction is slowed and may ultimately cost one or the other party due to a market price change in the interim. Therefore, prior art is unable to compensate for price or time-sensitive transactions because an electronic data interchange format template is required before a transaction between a customer and vendor can be effected.

However, prior art does attempt to at least facilitate EDI transactions. U.S. Pat. No. 4,951,196 (Jackson) provides a mechanism for constructing templates to receive incoming EDI data and present the data on a computer display, printer, or in a file on disk. Jackson enables trading partners to define formats of a dictionary-structured business transaction which provide the basis for subsequent entry and translation of EDI structured-data transactions. This, however, falls short of solving the problem because Jackson only enables creation of templates for mapping data on to a display as received from the originator. In the absence of a template definition, the Jackson system is of little or no utility in facilitating time-sensitive business data transactions.

Accordingly, there remains a need for a system which can enable the receipt, manipulation, and re-transmission of EDI structured-data in the absence of any pre-defined template or display format. Likewise there remains a need for a method of accepting EDI structured-data without prior knowledge of the chosen EDI Standard version for the incoming data streams.

SUMMARY OF THE INVENTION

This invention relates to a programmable machine system, and in particular to methods and apparatus for determining the formats of business transactions used in entering, storing, printing, and transferring data between vendors and vendees of goods and services using a standardized business transaction data coding scheme.

According to the invention, the new system can accept data streams of structured-data without the requirement of a template. If a template does exist, so much the better as transaction processing time is cut. But importantly, a template is not required in order to accept data, provided the data stream data conforms to the standardized business transaction data coding scheme known as EDI.

Under the present invention, if a template is provided, the system will parse the data stream using the template. Should it encounter improperly formatted data, or unexpected data out of sync with the template, the transaction will not abort and no error condition will result. Rather, the data that does conform will be recorded accordingly, and that which does not "fit" the template will nevertheless be parsed according to the standardized business transaction data coding scheme and concatenated to the bottom of the record.

According to the invention, all EDI standards for data coding are acceptable. For example, if an enterprise receives ANSI X.12 format documents from a U.S. customer, or UN/EDIFACT format documents from the customer's U.K. subsidiary, both formats may be parsed and combined under one trading partner. In particular, no partner set-up is required any longer in order to receive a typical transaction document. The information is received and a default set of users are notified of the transaction document arrival.

Another aspect of the invention utilizes a communications server to trigger INBOUND and OUTBOUND communications. Documents ready to transmit are automatically converted back to the originator's format and then transmitted via a preferred communications method associated with that trading partner. In this way, for example, purchase orders (POs) can be transmitted using, say, 2780/3780 protocol while invoices can be sent via an X.400 electronic mail format. However, all transactions are stored and maintained internally in a common internal system format.

The communications server is configured as an event driven system. When new documents arrive, specific users are automatically notified by selectable means which can include electronic mail, FAX, or locally printed hard copy. Moreover, pending transactions stored within the system can be maintained (e.g., browsed and modified as the particular transaction status changes) as information changes or new data arrives.

Another aspect of the invention is conversion from INBOUND documents to OUTBOUND documents, done by way of a re-mapping process using a cross-reference table. For example, a purchase order can be automatically converted to an order acknowledgement by way of this enabling translation mechanism.

Still another feature provides for dynamic update of partner information. If a trading partner changes EDI template version, the trading partner file is automatically updated and data is stored under the new version. Likewise, any subsequent outbound transmissions are executed using the new partner's format.

Moreover, no template need be provided. Data can be accepted in a "raw" format; that is, it need not conform to any previously agreed upon format per se, so long as the data can be mapped into the standardized business transaction data coding scheme.

No longer are major transactions slowed for want of a transmission template. Now a vendor can consummate a transaction and the vendee can receive a confirmation literally on the same day without having ever transacted any business previously. The confirmation may not appear as cleanly as it might in the face of a template set up between vendor and vendee, nevertheless, transactions can be immediately facilitated. This is a significant enhancement over existing technology.

DETAILED DESCRIPTION OF THE
PREFERRED EMBODIMENT

Figure 1:
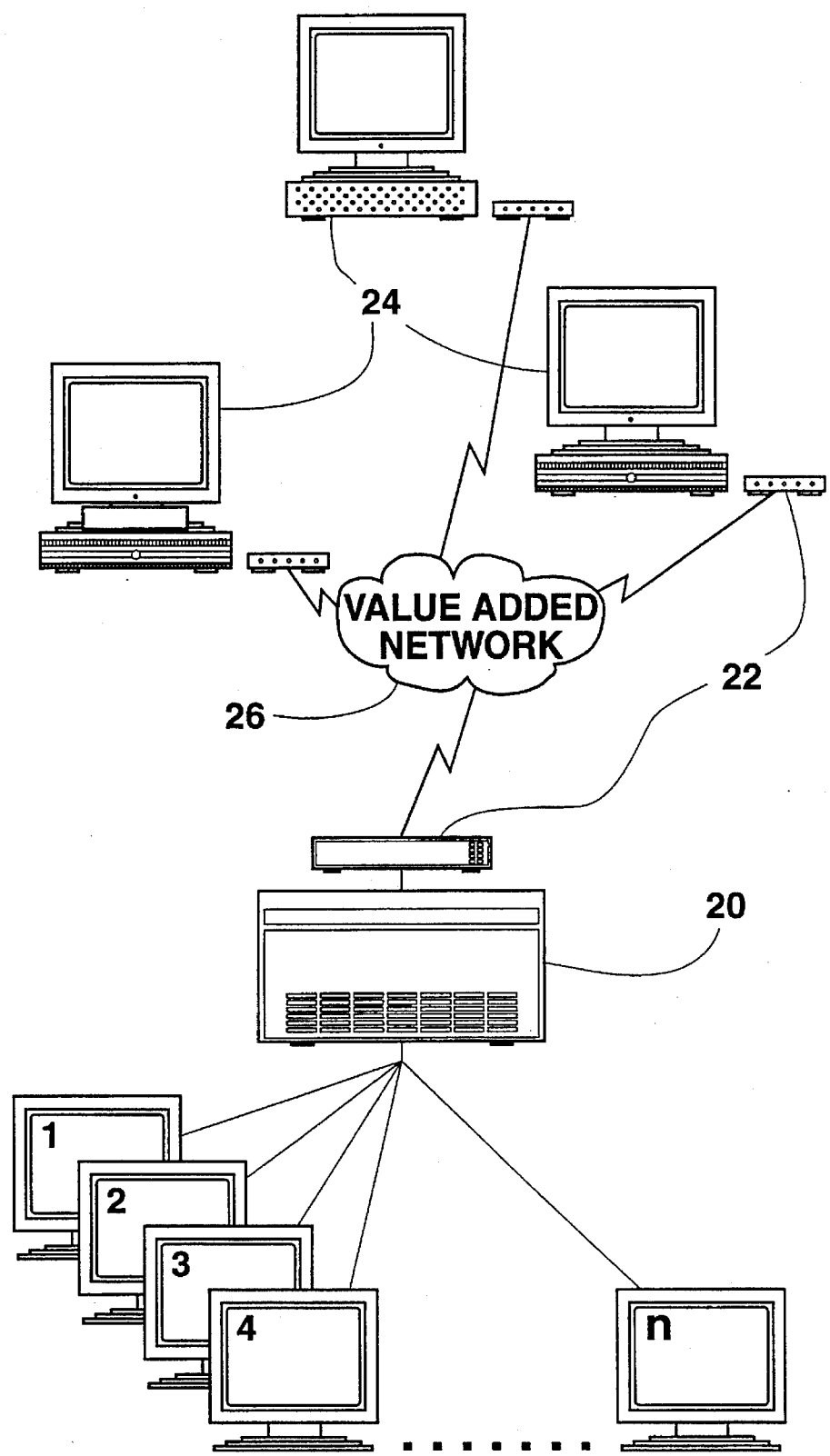
FIG. 1 illustrates a value-added telecommunications network for performing electronic data interchange between one or more trading partners maintained by a large multiuser pending business transactions system.

Referring to FIG. 1, a large vendor has the machine system 20 and one or more customers of that vendor each have a machine system 24. Electronic data interchange (EDI) transactions involve either the customer or vendor initiating a contact with another to electronically transfer data by means of a data modem 22 from their local machine to the recipient's remote machine. Frequently, a Value Added Network means 26 is employed in which the data transfer is electronically packaged into mail messages. Each mail message can contain one or more EDI transactions. In electronic data interchange, the customer typically defines the dictionary structured-data transaction format that all its vendors must use to communicate information about business transactions. See U.S. Pat. No. 4,951,196 to Jackson, incorporated herein by this reference. The present invention allows the vendor system 20 to accept an unlimited number of such dictionary formats for an unlimited number of customers, and if necessary, to accept structured-data in absence of a transaction format altogether. Moreover, the present invention provides the ability to store, maintain, and modify each structured-data transaction and then turn it around and re-transmit it back to the customer without re-keying data, such as in the case of an order confirmation.

The system as detailed below is a significant improvement over the prior art because for the first time, EDI structured-data transactions can be retained, modified and transmitted back to the originating customer without re-keying the data in. Important to this functionality, is the ability to receive EDI data in any of a plurality of EDI Standard formats, or even in absence of a standard, without requiring a previously arranged "template" for each vendor sending data to the customer.

System Overview

Figure 2:
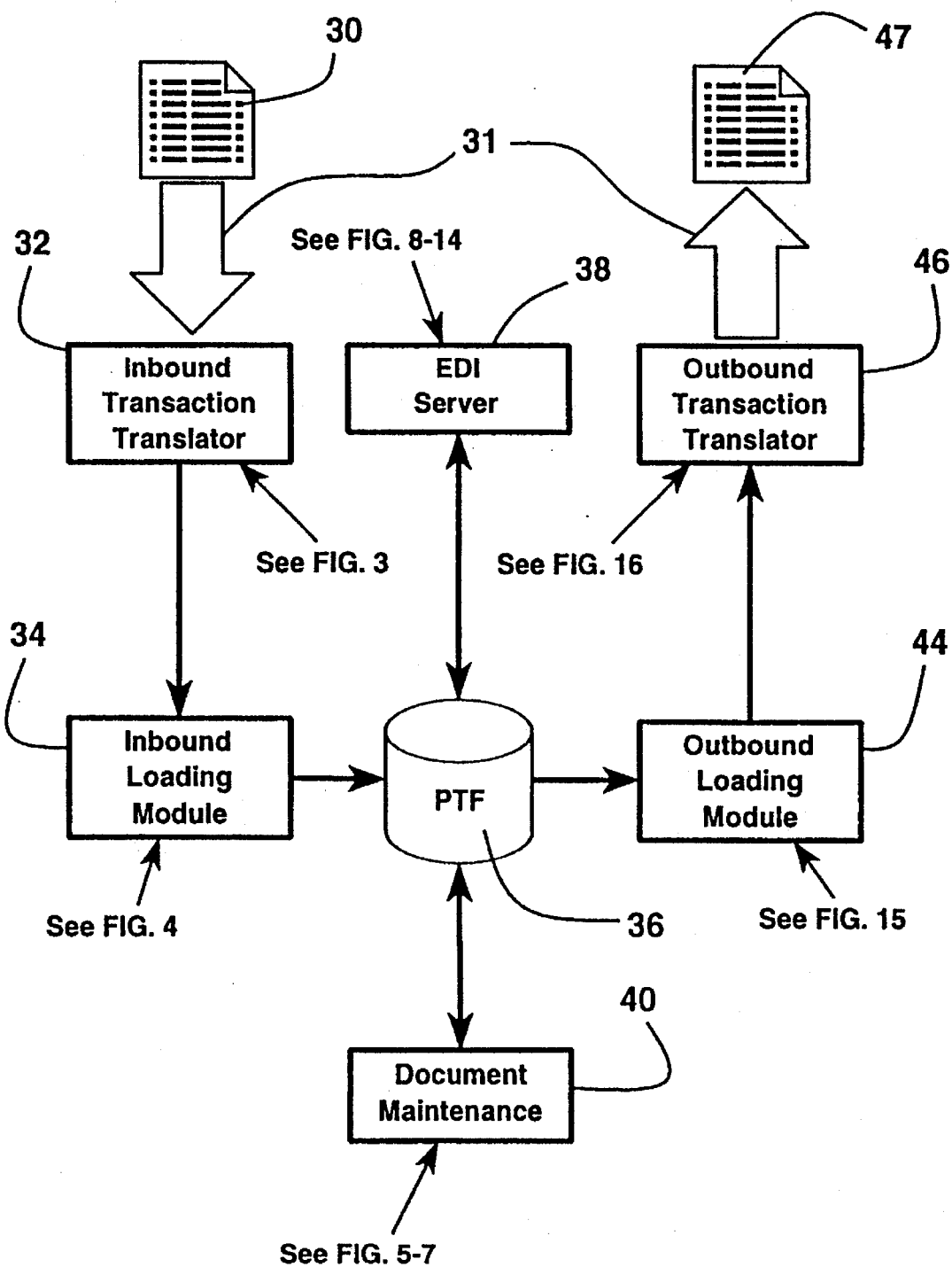
FIG. 2 illustrates the electronic structured-data pending transactions system. The focus of activity centers on a database of data transactions called a pending transaction file. Pending transactions are the result of an inbound transaction translator (FIG. 3) receiving incoming electronic mail passing EDI data to a loading module (FIG. 4) which actually loads the EDI data into a pending transaction record.

Referring to FIG. 2, the overall configuration of the system can be bifurcated into inbound and outbound transaction processing. The inbound side includes an Inbound Transaction Translator 32 which accepts the incoming raw data from mail messages 30 received by an event-driven communications server 31. The translator determines which EDI standard the incoming data relies on, and then translates the data from the incoming format to an in-house standard format called "internal system format" which can be subsequently used to display, print, or modify the transaction as well as store the data, and drive other aspects of a larger business data management system.

The system includes an Inbound Loading Module 34. This loading module loads the transaction data into a pending transaction file 36 for use by other modules which maintain the data 40, and prepare the data for outbound transmission 44. Data is stored in the PTF in the internal system format.

The system further includes a document maintenance module 40 which allows the user to monitor and maintain active pending transactions, including, but not necessarily limited to browsing, modifying, approving or rejecting transactions' status. The system also includes an EDI Server Module (ESM) 38 which provides automatic user notification for any changes in pending transactions on a scheduled update basis.

On the outbound side, the system provides an Outbound Loading Module 44 for loading transactions from the pending transaction file into an Outbound Transaction Translator 46 which will convert the transaction into the intended recipient trading partner's native standard format for return transmission via the event driven communications server 31 in the form of outgoing messages 47.

The Inbound Transaction Translator

Figure 3:
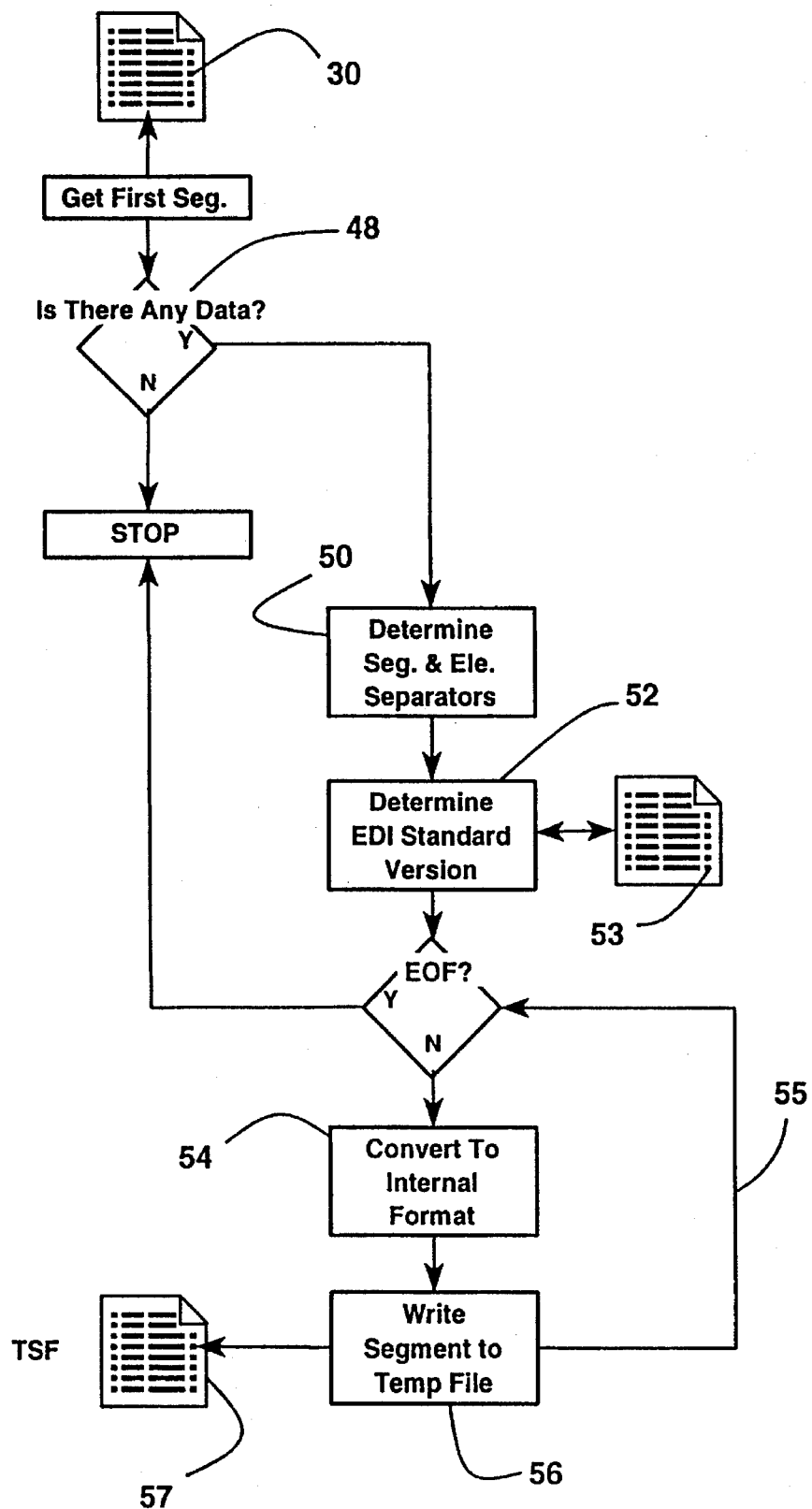
FIG. 3 illustrates the inbound transaction translator; a mechanism for translating incoming transmissions into a common format acceptable by a plurality of internal data manipulation mechanisms. This is accomplished by means of a mechanism which determines how records, fields, and elements are formatted in the transaction, and rewrites this data into a common format for internal use, thereby eliminating the need for each separate internal process to repeatedly convert data.

Referring to FIGS. 2 and 3, the Inbound Transaction Translator (ITT) is responsible for retrieving mail messages from a value added network and converting electronic transmissions into business transaction documents. Transaction mail message transmissions follow standard EDI format. Like regular mail, EDI requires that the data transmitted over a network from one trading partner to another be sent in an "envelope." Regardless of the EDI standards to which the customer subscribes, most message envelopes must begin with a header segment message and terminate with a trailer segment message. The envelope also contains a code to identify at the highest level what type of data is contained.

In addition to the envelope data, EDI transmissions have content data. This data consists of a stream of data segments and data elements, all according to a particular EDI standard identified in the envelope code. A data segment is the intermediate unit of information in a message. A segment consists of a pre-defined set of functionally related data elements which are identified by their sequential positions within the set. A segment begins with a segment identifier, a unique three character alphabetic, upper case code which uniquely identifies each segment and ends with a segment terminator. When data segments are combined to form a message, their relation to the message is specified by a data segment sequence. An EDI data segment is analogous to a logical record.

FIG. 3 illustrates the method by which the system converts an electronic transmission into an EDI transaction. The first step 48 is to determine whether there even is data. If there is data, the element separator and segment terminator are determined 50. Finally, the EDI Standard Library version can be determined 52. First, the element separator must be determined. The value of the element separator is positionally defined in the record according to EDI conventions. Having determined the element separator character, the records can be parsed to determine the segment terminator character. Guided by the knowledge of the separator and terminator character values, the envelope data is parsed for the EDI standard version (data which is also positionally defined).

Next, a trading partner master file 53 is checked to determine whether there is an entry for this trading partner which defines the partner's chosen EDI standard version, and terminator separator characters. If this is the first transmission ever received from the trading partner, then basic information regarding the EDI standard version utilized, and specific element and segment separation termination characters for that partner's transmissions is entered in the trading partner master file. Having determined which version of the standard is employed, the system can now convert each incoming data segment 54 to an internal system format, which is typically the vendor's preferred EDI standard version, optionally with some modifications. This conversion step eliminates the need for other sub-systems (e.g. doc maintenance 40) to determine which EDI standard was used to encode the data. As the data is converted, each data segment is written 56 to a temporary sequential file 57 for subsequent processing by the Inbound Loading Module 34. The convert and write loop 55 is repeated until the end of a transaction (EOF)is detected.

The Inbound Loading Module

Figure 4:
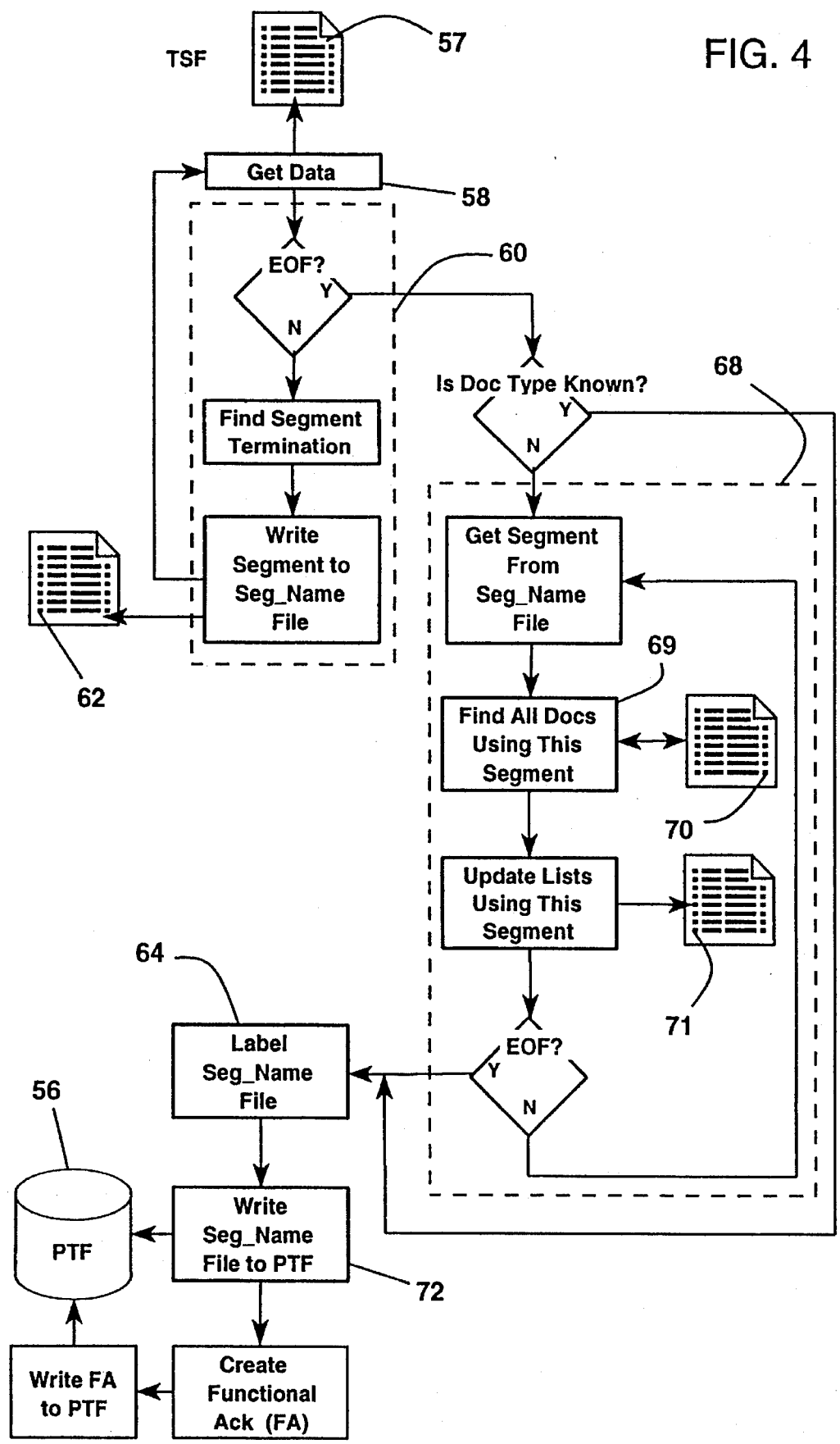
FIG. 4 illustrates the inbound loading module which enables the transfer of the incoming transmission into the pending transaction file. Working from a temporary file created by the inbound transaction translator of FIG. 3, this process writes the data into a separate file which is subsequently labeled with the type of document the file represents (e.g., a purchase order, change order, etc.). The process may require identification of the document type should this transaction arrive from a new trading partner or a partner whose configuration file or "template" fails to identify the document type. In that event, this process takes additional steps to compare the current data with all document types known to the system in order to identify its type. Type identification is based on pattern recognition, whereby each structured-data transaction orders data in such a way as to uniquely identify each type of transaction.

The process of loading the transaction into the pending transaction file can be best explained by referring to FIG. 4. As the data is fetched 58 from the temporary sequential file 57, a continuous check for segment termination 60 determines the segments, their order, content and size, all of which is stored in a segment name table file 62. Once the end of the file is reached, the type of document can be determined. If known, the resulting segment file is labeled 64, and loaded into the pending transactions file 36. If, on the other hand, the transaction document type is unknown or undeterminable from the data received, an additional process 68 is employed to determine the intended type of transaction document.

Process 68 involves comparing the current transaction with a predetermined dictionary of all EDI document structures 70. A pattern comparator mechanism 69 reads each segment in the segment name table file and creates a temporary list 71 of all EDI documents employing that particular segment type. By process of elimination, as each segment is sequentially read from the table file, the class of EDI transaction i.e. the document type that corresponds to the segment name table file may be determined. Once the document type has been identified, the segment file is labeled 64 and written 72 to the pending transactions file 36.

The type of document (e.g., a purchase order) is important for subsequent processing of the transaction. The EDI standard version, segment terminator, and element separator characters are important for conversion and retransmission of the EDI transaction to the originator or possibly other downstream EDI recipients.

The Document Maintenance Module

Figure 5:
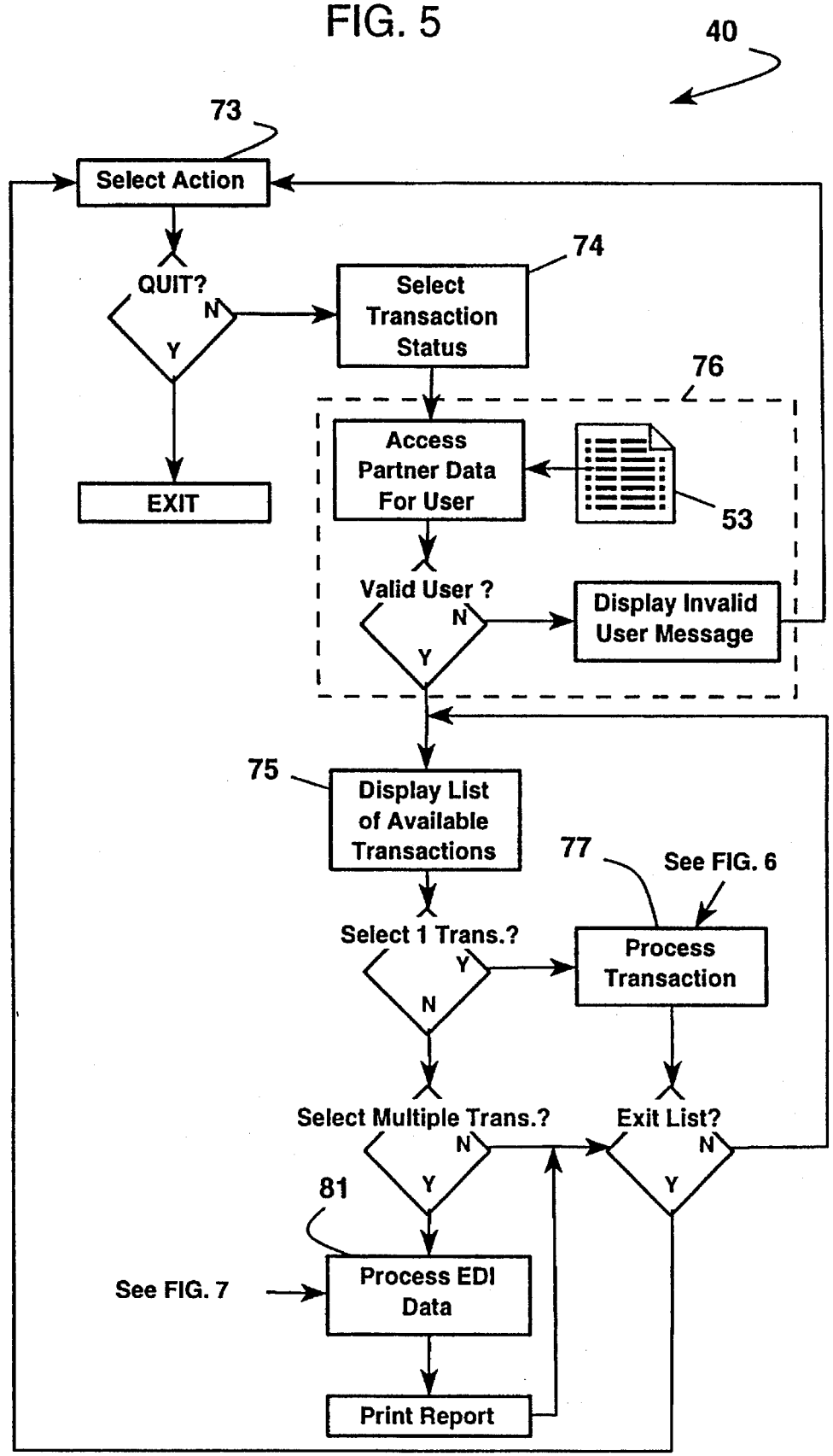
FIG. 5 illustrates the mechanism which enables the user interface of the tracking system. Users select actions which process a transaction (FIG. 6), and subsequently select the status of they wish to track or modify. A status can be anything say, "error," "accept," etc. Once the particular user is "cleared" or validated to manipulate a given transaction group, then all transactions accessible under the combination of action and status are displayed.
Figure 6:
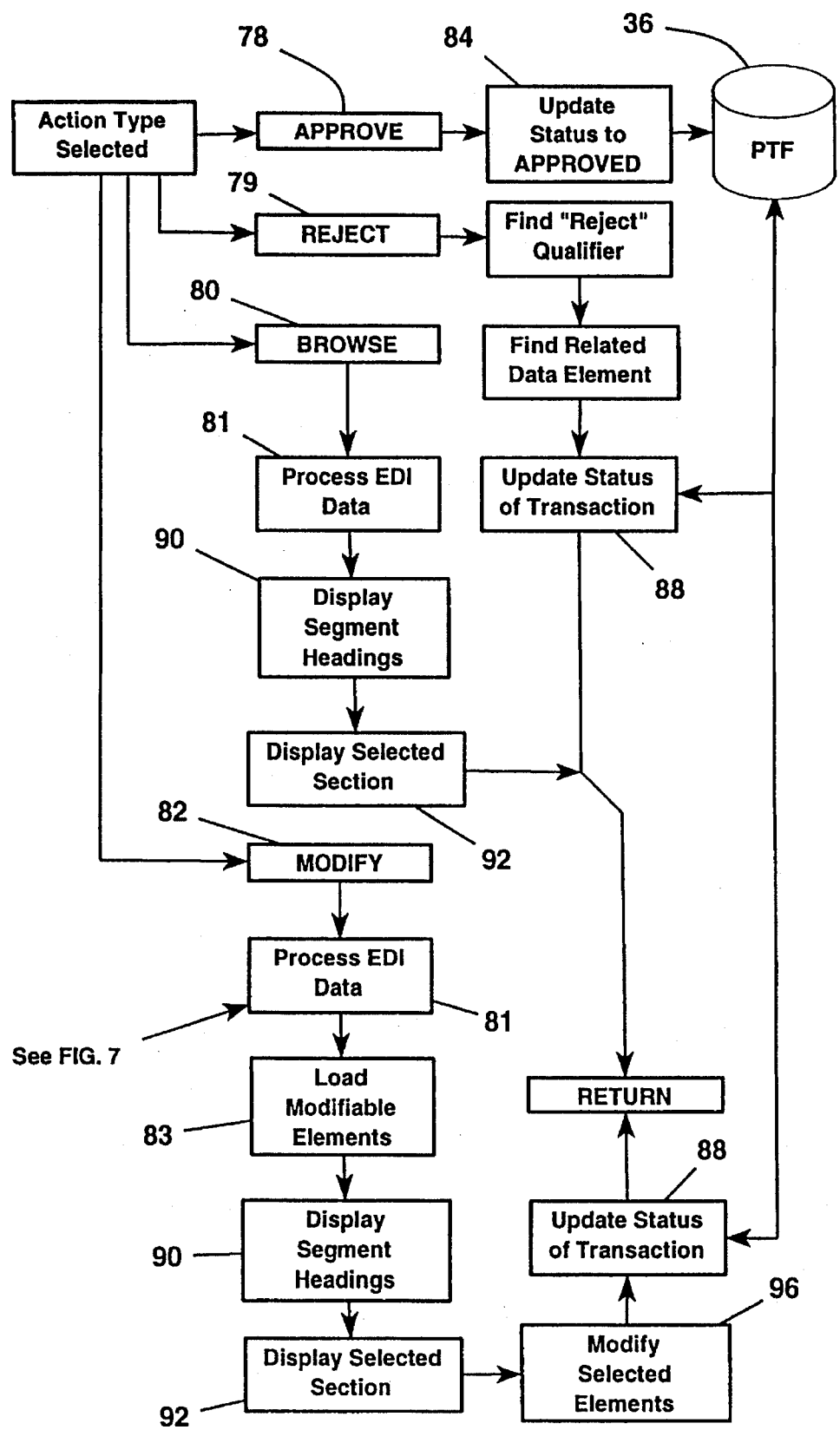
FIG. 6 illustrates the mechanism by which the user can actually act on a set of transactions (e.g., approve, reject, browse or modify). Once the action is selected, the EDI data associated with the particular transaction(s) is processed according to FIG. 7.
Figure 7:
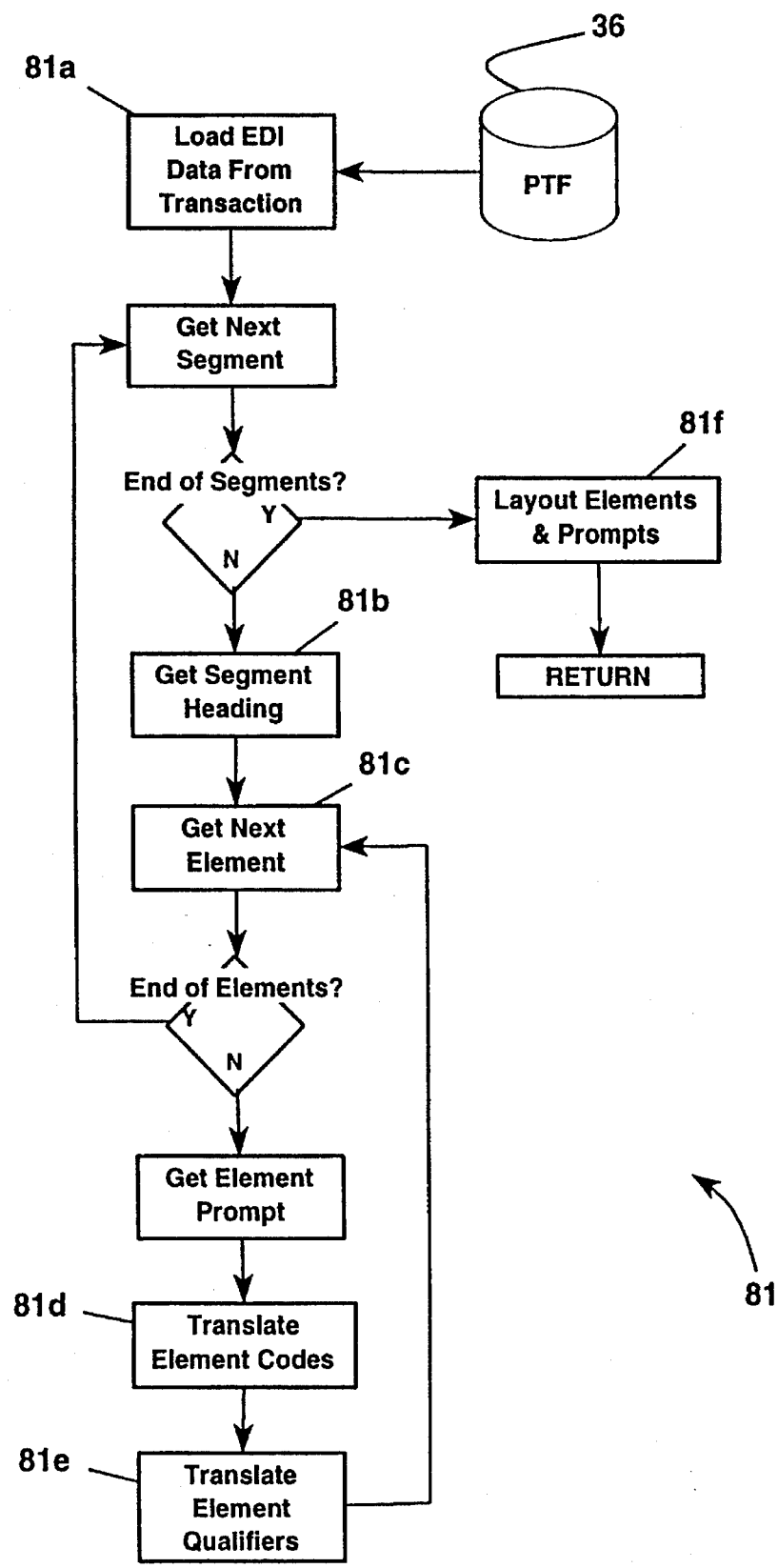
FIG. 7 illustrates the retrieval process of EDI data from the pending transaction file and conversion from the internal storage format into a human readable format displayable on a computer screen or printable on a hardcopy device.

The Document Maintenance module (DM) 40 in FIG. 2 is a user interface to allow user review and modification of pending transactions. Referring to FIG. 5 through 7, the DM allows a user to approve, reject, browse, modify or print pending transactions for which they are responsible to track.

User Access Validation and Transaction Selection

In FIG. 5, A pop-up menu process 73 allows the choice of any of four options as shown in FIG. 6 (e.g., "approve," "reject," "browse," or "modify"), while printing is handled by 76 a process following recovery of selected data. Once a principal selection has been made, the user next selects from a second pop-up menu 74 the status of the transaction they wish to operate on. Transaction status can be any of several states of the transaction. For example, status can be "error," "modified," "update," "merge," "inactive," "completed," etc.

Selection of any option first requires the system to validate user access 76. In the EDI system only authorized users may access transactions. For example, a user tracking orders for customer A may not be allowed access to orders of customer B, and vice versa. Therefore, the trading partner master file 53 is checked to determine which transactions the current user is authorized to access. Once the user is validated, a list is displayed 75 of all transactions associated with the current user. The user then selects one or more transactions to operate on if multiple transactions are selected, then the system determines that a report is requested, and the EDI data is processed 81 (shown in FIG. 7) to prepare a print-out. If only one selection is made, then the Process Transaction module 77 (shown in FIG. 6) is invoked.

Approve/Reject

Suppose the user selects a single transaction. Referring to FIG. 6, should the user elect to approve a transaction 78, an update status field is flagged 84 for the transaction in the pending transactions file. In the event of a rejection 79, the rejected element of the transaction is flagged 86 and the pending transactions file is updated 88.

Browse

Should the user wish to browse transactions and their segments 80, the Process EDI Data module 81 is invoked and the desired data is loaded and displayed. (see FIG. 7.) Once loaded, the segment identifiers or "headings" are displayed 90 and at the user's option, a selected section (according to the segment identifier) of the transaction is displayed 92 (e.g., customer shipping address data). Once finished browsing, control returns to the action-selection menu 73 (FIG. 5).

Modify

Likewise, if the user elects to modify a transaction 82, essentially the same process is followed. First, the EDI data is processed as shown in FIG. 7 (described infra). In this case, the modifiable elements (those that may be altered) are loaded 83, then segment identifiers are displayed. Next, user selected sections containing the modifiable elements are displayed, and the user is allowed to modify selected fields 96. These modifications are then sent to pending transaction file 36 by means of the update module 88.

Processing EDI Data

Referring to FIG. 7, the method 81 of FIG. 6 for processing EDI data involves retrieving "raw" EDI data from the pending transactions file. EDI data is stored in a (raw) machine format for optimal memory consumption. In order to present it in human readable format, a given EDI transaction is loaded 81a for conversion. Sequentially, each segment is mapped by first recovering the segment heading 81b which identifies the segment, and then for each segment, each element of the segment is recovered 81c. Each element is encoded and the value of each element is stored in a "qualifier" field. In order to present the actual transaction information either on screen or in a printed report, each element must be translated 81d and its value decoded 81e from its internal storage format within the pending transaction file. Once all segments and associated elements for the given transaction have been retrieved and translated, they are formatted for display or printing 81f.

The EDI Server Module

The EDI Server module (ESM) 38 of FIG. 2 periodically checks the pending transactions file (PTF) 36 for incoming transactions from customers, notifies users by electronic mail of incoming transactions and whether or not each transaction requires an acknowledgement or response to the originator. The ESM runs on a regular basis, depending on the rate of arrival of pending transactions. The ESM checks each pending transaction as it arrives and each time it is modified. Each transaction can be analyzed for a plurality of conditions, such as being in error, requiring modification, or ready for user verification. Users receive electronic mail regarding transactions only for which they are responsible.

Figure 8:
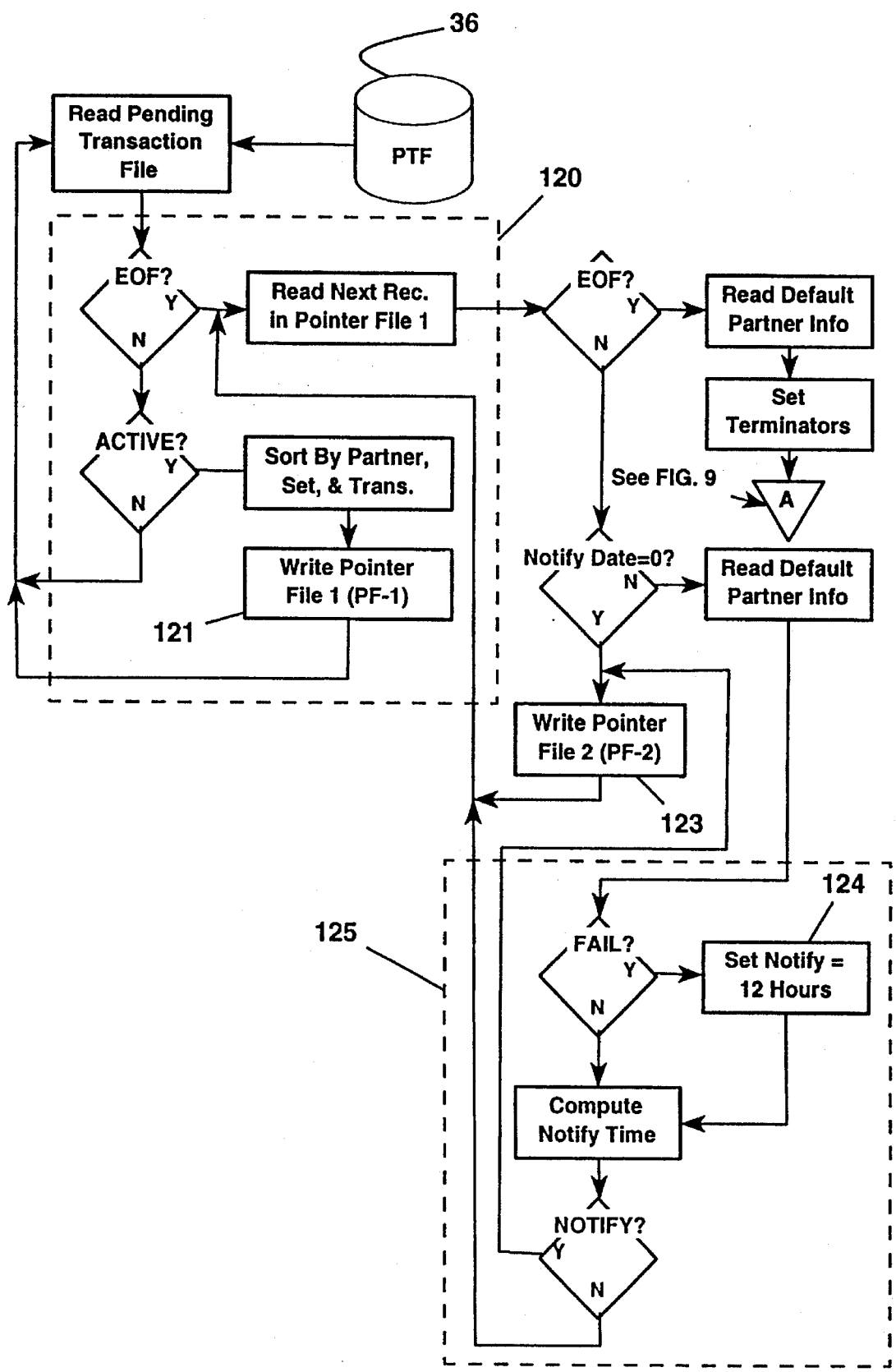
FIG. 8 illustrates the top level of a series of drawings (FIG. 8 through FIG. 12) which depict the EDI Server, a mechanism which is employed to track the status of incoming transactions, provide user notification of transaction status, and verify data content of transactions according to a multiplicity of checks which can be requested by the trading partner or the user. This drawing illustrates the particular mechanism for checking the pending transaction file for new transactions or transactions requiring user notification of pending status. Once all transactions requiring user attention have been marked for retrieval for a given trading partner, transaction error checking may begin as shown in FIG. 9.

Referring to FIG. 8, the PTF 36 is read for active transactions 120 and each transaction is checked for the need to notify the responsible party tracking the transaction 125. To accomplish this, a very straight forward file parsing mechanism is implemented as shown. If the PTF has active transactions, they are sorted by vendor, according to a set Identifier and a transaction type. A file of pointers (PF-1) 121 is written which contains pointers to the records in their sorted order from the PTF for subsequent access. In other words, records are stored sequentially 1,2, 3, and so on, in the PTF. The PF-1 121 records their sorted order which might could be in any sequence, say, 3, 1, 2. Having read all of the active transactions, ESM can now determine which require notification, and what the notification should be. First, each record, in the order according to PF-1, is checked for a notification flag. If there is a notification flag, then this record number is written to a second pointer file (PF-2) 123. If there is no notification flag set, the master trading partner file is checked for notification data. If the system fails to recover notification instructions from the partner data, then a default of 12 hours is set 124. The notification time is computed and if the twelve hour window has expired from the time of receipt of the transaction, then this record is also referenced in PF-2, 123. Once all records requiring notification have been referenced in the second pointer file (PF-2), the partner data on how records are structured must be parsed from the master trading partner file. The data describes the terminators used to separate the segments and elements in the records.

Figure 9:
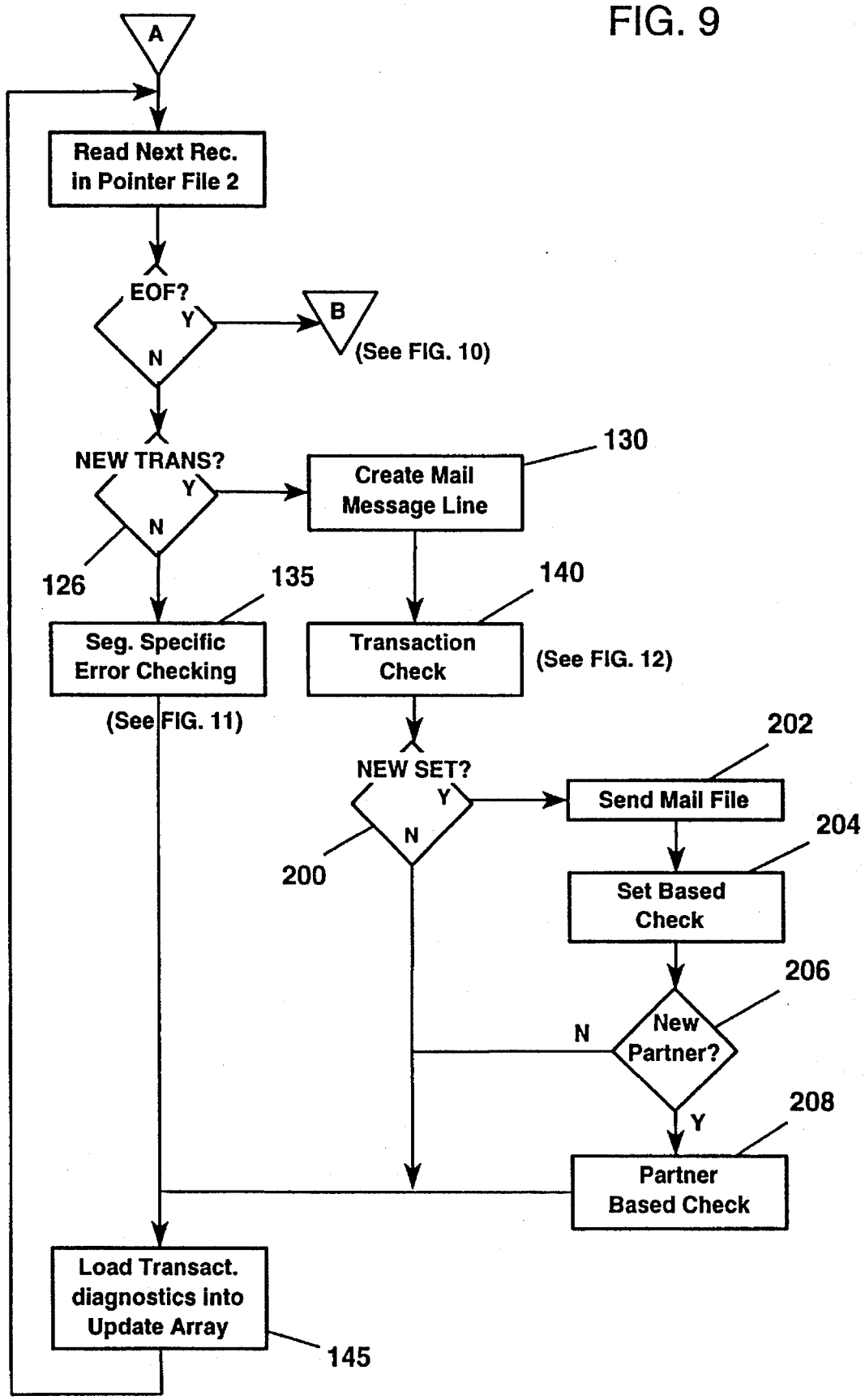
FIG. 9 illustrates the process by which each transaction is subjected to one or more checks depending on whether it is a new transaction or not. New transactions are subjected to overall transaction checking shown in FIG. 12. Existing transactions retrieved for their active status, are subjected to specific error checking shown in FIG. 11. Once the transaction diagnostics are complete for all transactions in the set, actual status updates for each transaction can be written to their records in the pending transaction file as shown in FIG. 10.

Referring now to FIG. 9, should an electronic mail notification be required, a test 126 is made to determine if this is a new transaction. If so, the EDI server creates a mail message 130 with data on the nature of the transaction. If this is not a new transaction, the EDI Server can invoke specific verifications on the integrity of segment structures, 135 (refer to FIG. 11). On the other hand, if the transaction is a new one, a mail message is initiated, and the EDI Server can invoke a plurality of transaction checks 140 (see FIG. 12).

Figure 9A:
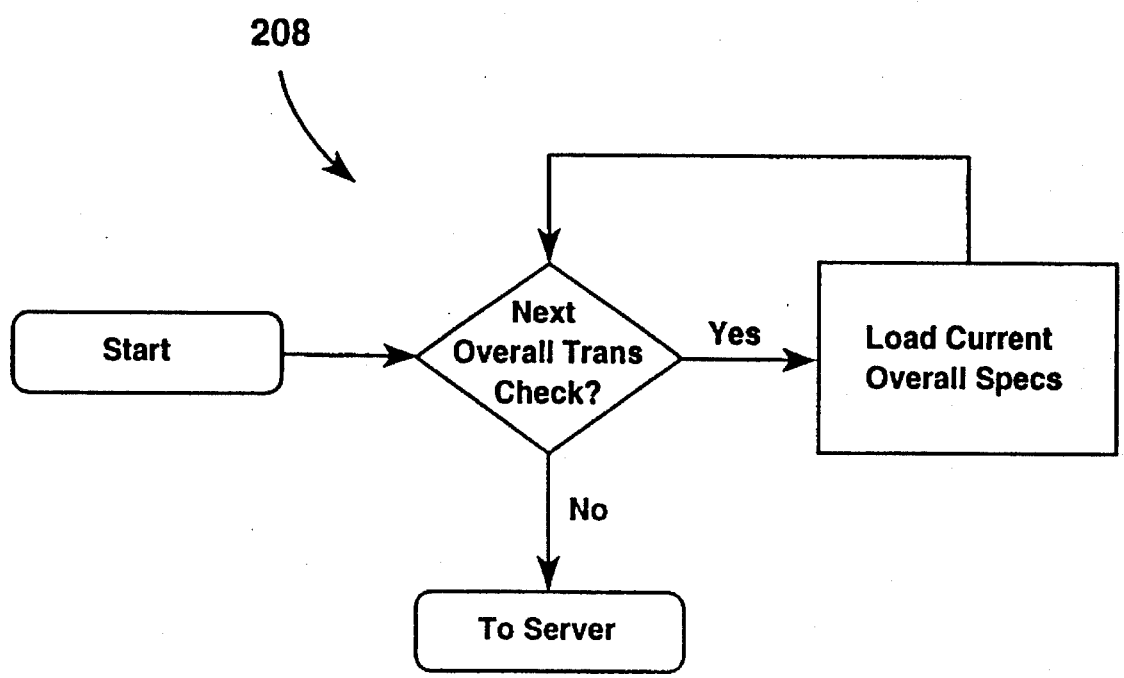
FIG. 9A shows detail of the "Partner Based Check" process 208 of the diagram of FIG. 9.

If this is a new set 200, send mail 202 created during transaction check 140. Next, perform Set Based Check 204 to translate the Transaction type code into human readable form. If this is a new trading partner 206, perform partner check 208 which loads a plurality of partner checks (see FIG. 9A). As each module 135 and 140 return, an update array 145 is written with the resulting diagnostics from the various segment and transaction checks performed.

Figure 11:
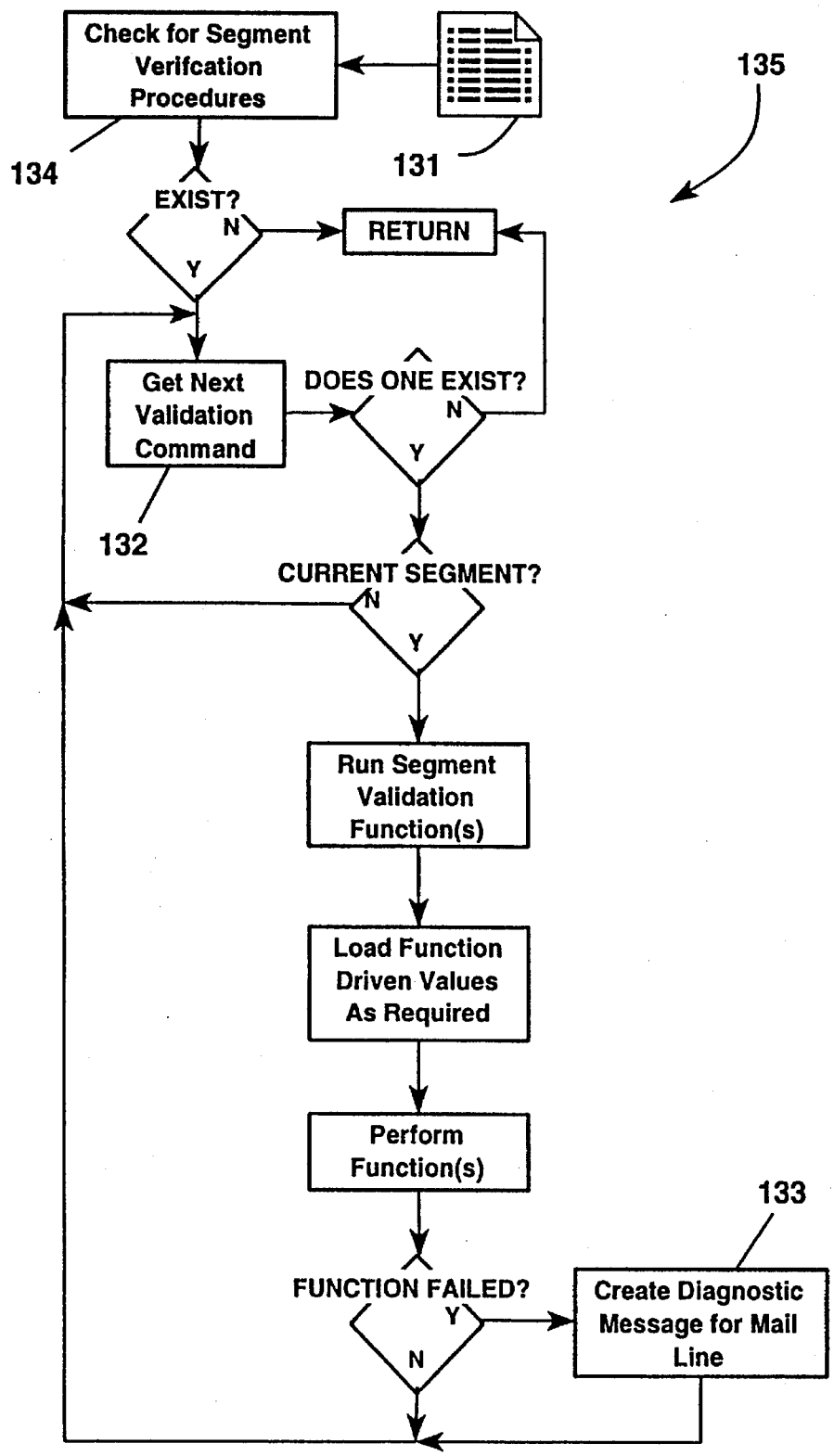
FIG. 11 illustrates the mechanism for running one or more specific verification/validation procedure/commands. A verification procedure can contain one or more validation commands. Those commands enable specific segment checks to be made. A segment is part of a record containing individual elements. For example, one may wish to verify the correct "ship to" address, or whether a specific element falls within an accepted range such as a quantity.

Referring to FIG. 11, a trading partner actions file 131 is checked for specific instructions on verification procedures for segments 134. A verification procedure can contain one or more validation commands 132. Those commands enable specific segment checks to be made. For example, one may wish to verify the correct "ship to" address, or whether a specific element falls within an accepted range such as a quantity. These validation tests can result in additional diagnostic messages 133 written to a mail message.

Figure 12:
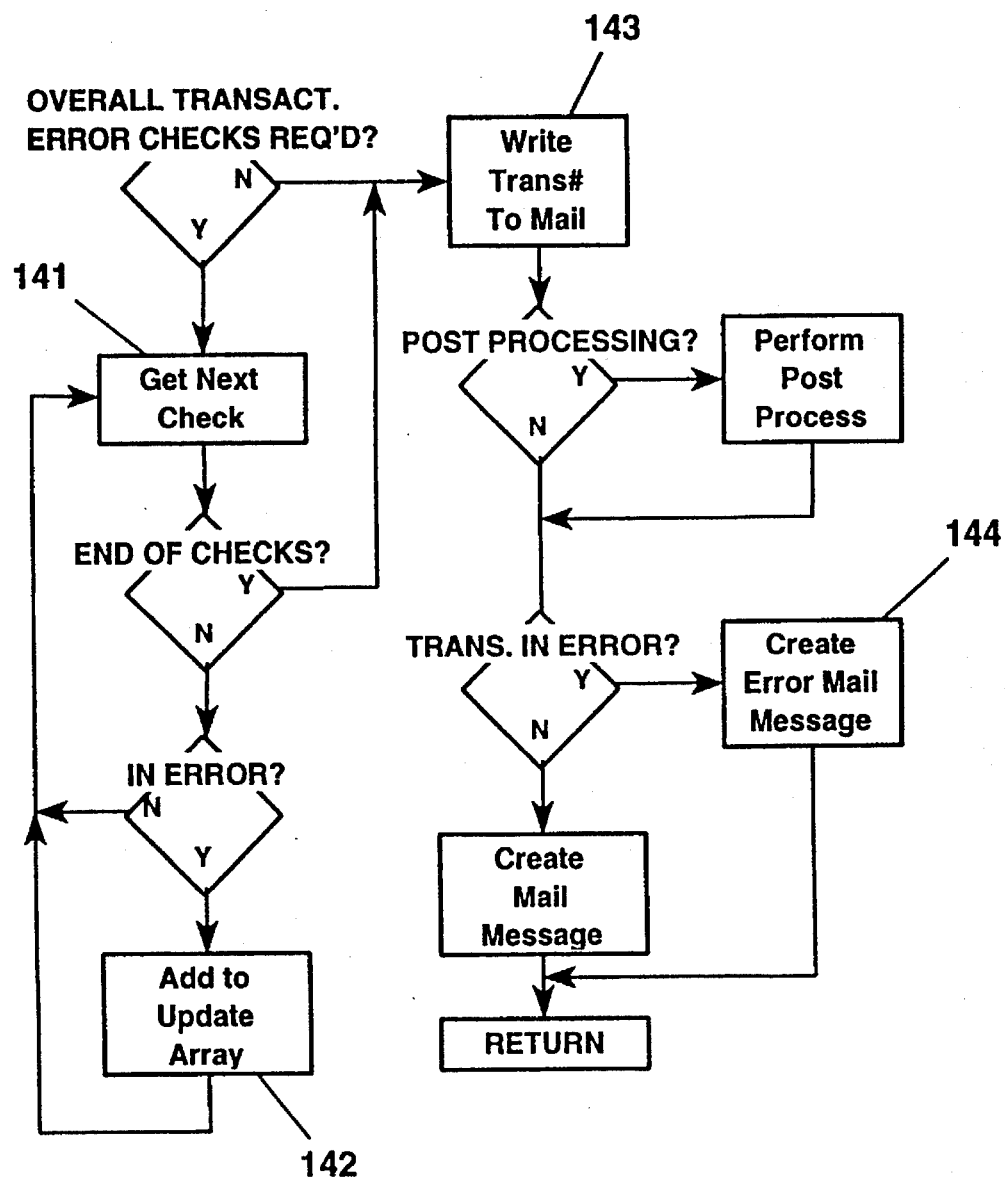
FIG. 12 illustrates the enabling process for overall transaction checks. Users may have requirements for specific types of information. For instance, a trading partner may mark transactions with some unique identifier, say a sequence number. This process enables post processing of the transaction for this additional data. Any kind of post process may be added to this framework depicted in the drawing, as one or more "checks" can be added by simple program enhancement.

Referring to FIG. 12, overall transaction error checks can be initiated 141 according to partner trading information in the master trading partner file. Each trading partner can request certain overall transaction verification steps to be taken by the customer for each transaction. If errors are discovered, they are added to an update array 142. Once the overall checks are completed, the transaction number in issue is written to the mail message 143. Next, any post processing desired by the user can be initiated, such as verifying the number of records per transaction, whether or not the transaction is a duplicate, or other validation tests.

Users may have requirements for specific types of information. For instance, a trading partner may mark transactions with some unique identifier, say, a sequence number. Post processing of the transaction enables checks for this additional data. Any kind of post process may be added to this framework, as one or more "processors" can be added by simple program enhancement. Resulting errors from said post processing are written to an error mail message 142, which will subsequently be added to the notification mail 144.

Figure 10:
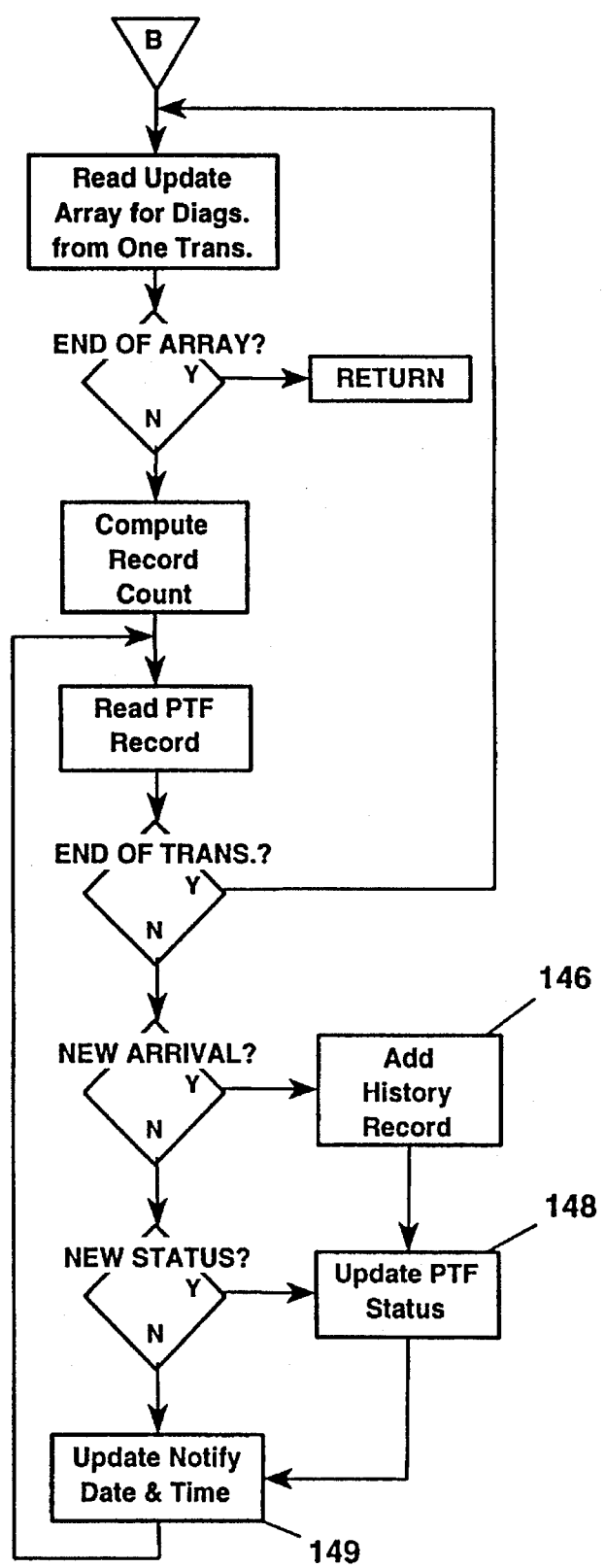
FIG. 10 illustrates the process of incorporating all the diagnostic results acquired by the overall transaction checks (FIG. 12) and/or by the specific error checking (FIG. 11) into the pending transactions file.

Referring to FIG. 10, once all update data is captured for the transactions requiring notification, each pending transaction can be updated 148 with a new status value according to the diagnostics contained in the update array 145 of FIG. 9. If this transaction is a new arrival, a transaction history record field 146 is added to the PTF transaction record. Finally, notification time is updated 149 for the transaction.

The Outbound Loading Module

Figure 13:
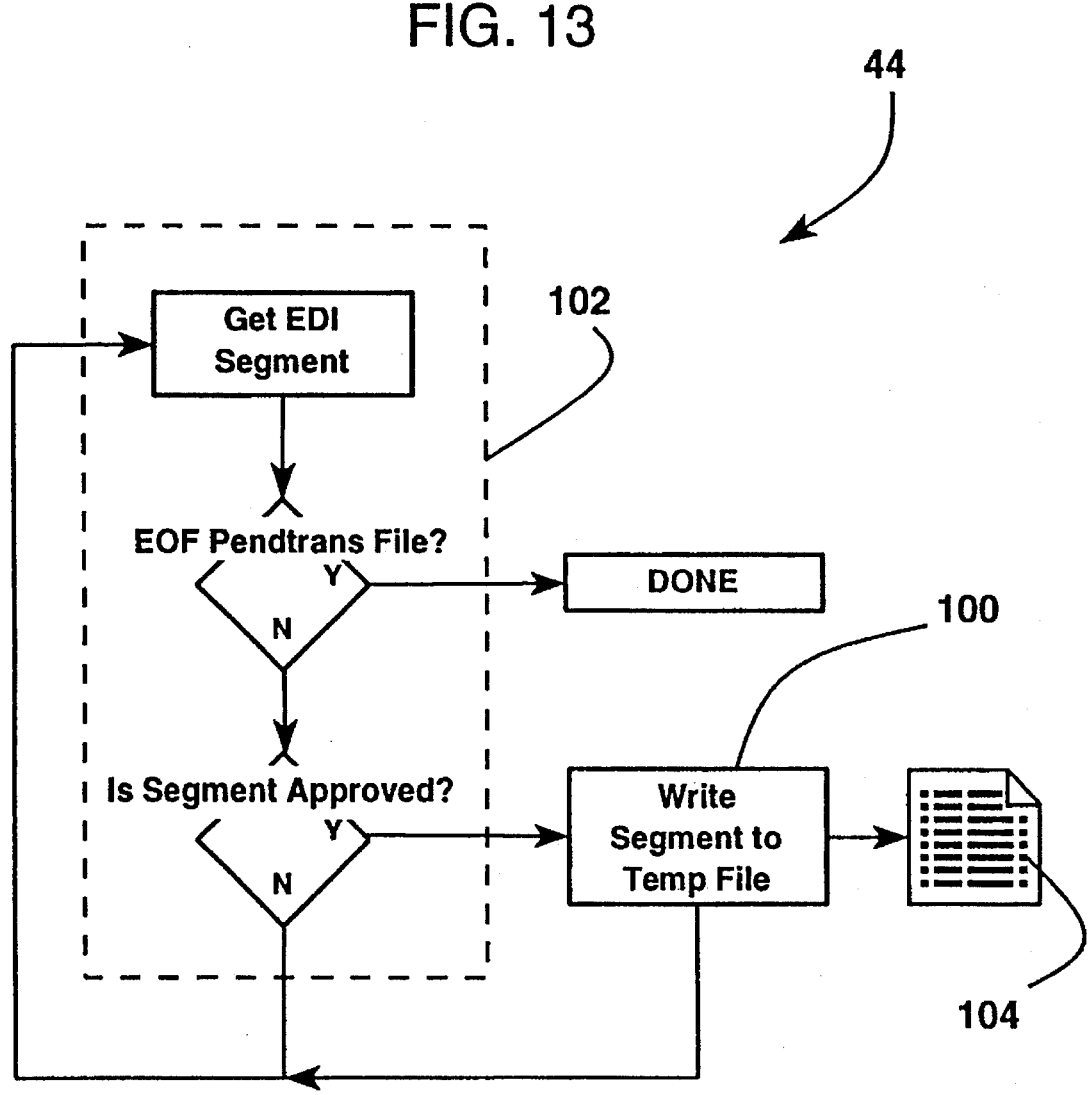
FIG. 13 illustrates the outbound loading module; the process for repackaging the transaction, to ready it for transmission out-bound to the treading partner or third party.
Figure 15:
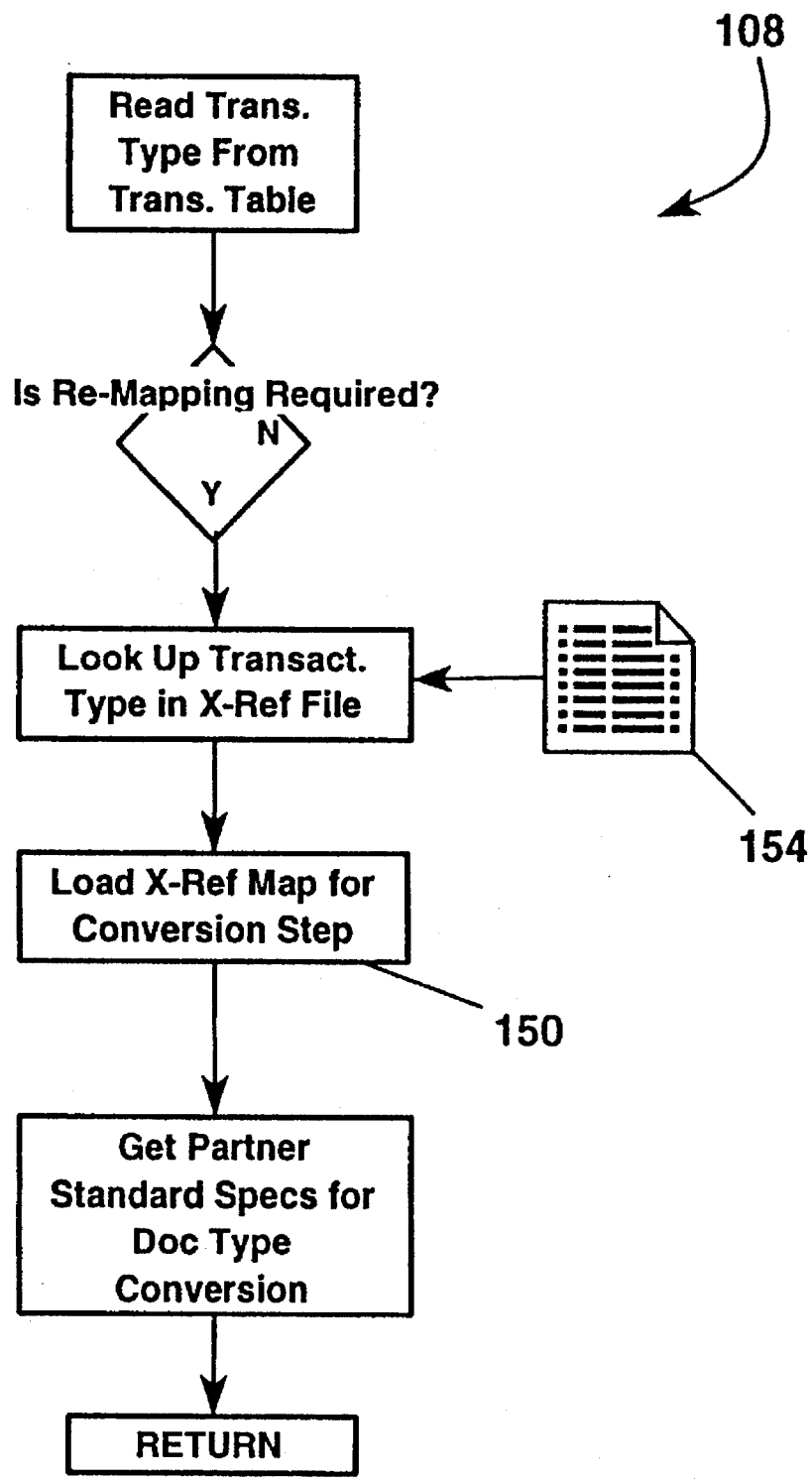
FIG. 15 illustrates the mechanism by which a given transaction can be re-mapped for outbound transmission according to a cross reference file of transaction types. This cross reference file (X-Ref) maps one document type to another. The particular map required for the conversion is loaded into the system and used in the actual conversion step (FIG. 14).

The Outbound Loading Module (OLM) 44 shown in FIG. 13 loads an EDI transaction from the pending transaction file 36 into a temporary file 100 shown in FIG. 15. The procedure is a iterative process 102 of parsing the transaction record in the pending transaction file, loading approved segments from the transaction record and writing them to a temporary file which drives the Outbound Transaction Translator 46 in FIG. 2. Leading and trailing segments which identify the type of transaction are replaced according to the specifications found in the data file for the trading partner.

The Outbound Transaction Translator

Figure 14:
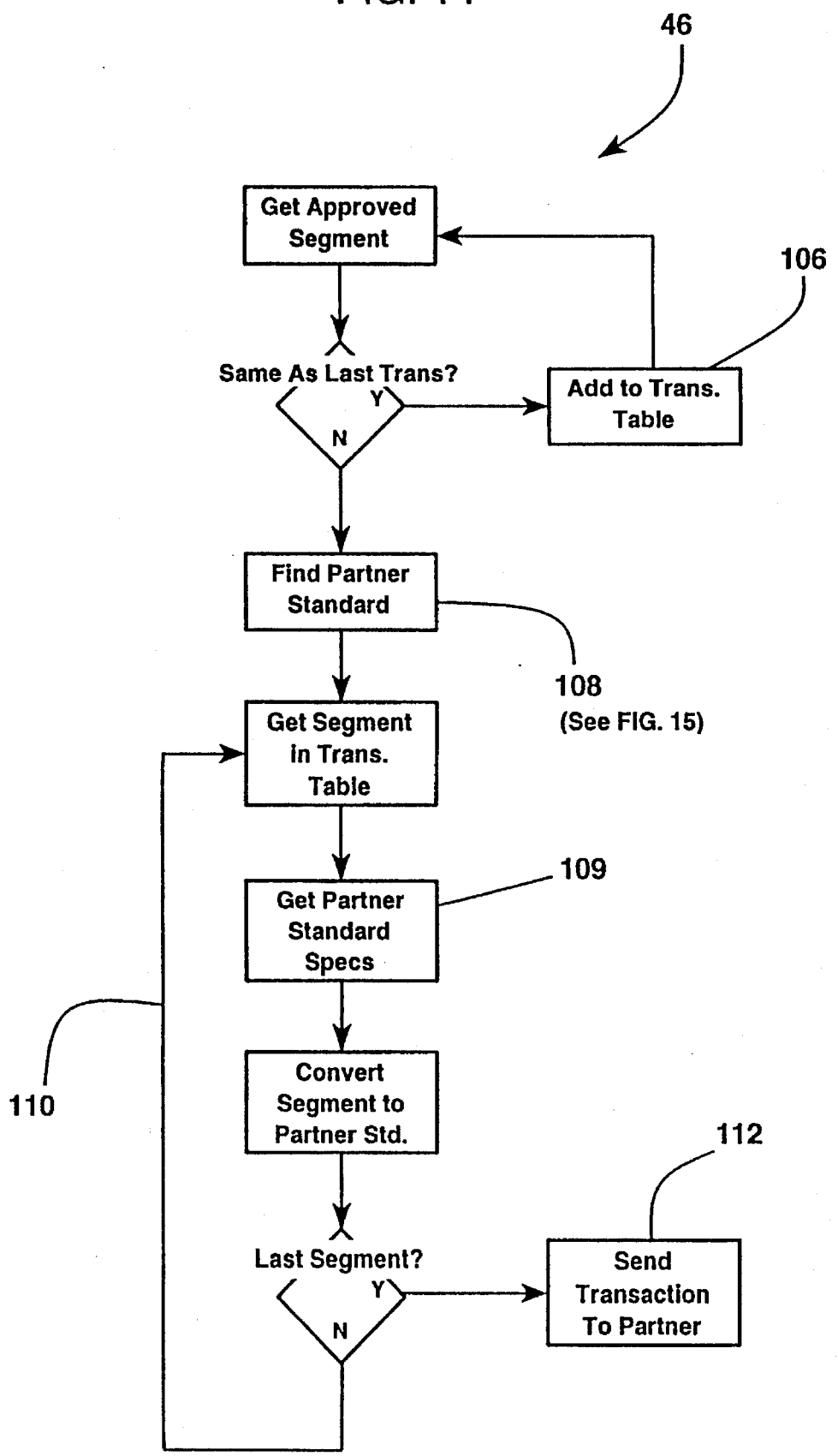
FIG. 14 illustrates the outbound transaction translator; the conversion process by which EDI data for a given transaction which has been retrieved by the outbound loading module (FIG. 13) is packaged according to the standards employed by the trading partner. At this juncture of the entire process, the outbound transaction translator has the ability to detect that a given transaction not only needs to be repackaged according to the trading partner's preferred EDI standard version, but that the resulting re-packaging should create a different type of document. For instance, a "purchase order" automatically becomes a "purchase order acknowledgement" upon acceptance by the vendor. The step enabling this depicted in the drawing is further illustrated by FIG. 15.

The Outbound Transaction translator (OTT) 46 shown in FIG. 14 loads the temporary approved segments file 104 created by the Outbound Loading Module and translates them back into the originator's standard according to the data stored in the partner template file regarding segment and element terminators. FIG. 14 illustrates the flow of the method whereby approved segments are loaded into a translation table 106 for conversion. The OTT then determines the EDI standard employed by the originating trading partner when the transaction originally was transmitted 108. At this juncture of the entire process, the OTT has the ability to detect that a given transaction not only needs to be repackaged according to the trading partner's preferred EDI standard version, but that the resulting re-packaging should create a different type of document. For instance, a "purchase order" automatically becomes a "purchase order acknowledgement" upon acceptance by the vendor. The step enabling this depicted in the drawing is further illustrated by FIG. 15.

Referring to FIG. 15, if the OTT detects the class of transaction to be, say a "purchase order," for instance, then OTT will automatically map this outbound transaction into an EDI standard "purchase order acknowledgement." This requires mapping of segments 150 from their EDI standard format as described in the segment translation table 106, into their new format according to an EDI document cross-reference file 154. To do the actual mapping, step 109 of FIG. 14 (converting each segment into the partner standard) is provided with the proper formatting data based on this re-mapping step of 150.

Once the standard is determined and whether or not a re-mapping is required, an iterative process of converting the segments 110 runs until all segments in the transaction table are converted. Upon completing translation of the last segment in the table, the resulting structured-data transaction is then ready for transmission back to the originator 112.

Having illustrated and described the principles of the invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A combination software and hardware system, for managing electronic data interchange (EDI) between a sending trading partner and a receiving trading partner, the system comprising:

a) receiving means for receiving data from said sending trading partner, said received data containing, selectively, standard EDI structured data and non-standard EDI data, and said non-standard EDI data having a structure substantially similar to a standard EDI data structure, and said non-standard EDI data or an identifier associated with said non-standard EDI data being corrupted before being received by the receiving means;

b) compare means, coupled to said receiving means, for comparing said structure of said non-standard EDI data received to a library of standard EDI data structures, and identifying a standard EDI data structure in said library most similar to said structure of said received data; and c) data file creating means, coupled with said compare means, for creating from said received data without interactive intervention a data file having a structure definition the same as said standard EDI data structure in said library compared to be most similar to said structure of said received data.

2. The system according to claim 1 wherein said non-standard received data and library of standard EDI data structures include distinguishably delimited segments of data for identifying said standard EDI data structure in said library most similar to said structure of said received data.

3. The system according to claim 2 wherein said received data is compared to said library of standard EDI data structures by means of pattern recognition of said distinguishably delimited segments of data of said received data and library of EDI data structures.

4. The system according to claim 1 further including storage means for storing said received data.

5. The system according to claim 4 wherein said data file is stored in said storage means.

6. A combination software and hardware system for managing and maintaining data received from a sending trading partner and for accessing said data by a receiving trading partner, the system comprising:

a) data file creating means, for creating from said received data first and second data files, said data being, selectively, standard Electronic Data Interchange (EDI) data and non-standard EDI data, and said non-standard EDI data having a structure substantially similar to a standard EDI data structure, and said non-standard EDI data or an identifier associated with said non-standard EDT data being corrupted before being received:

a1) said first data file having a pre-defined template format for managing any of said received data that conforms to said template format, said first file created from a merging of received data that conforms to said template format into data fields of said template format; and a2) said second data file for managing any of said received data that does not conform to said template format, said second file created from a transfer of said data to said second file without any template format interpretation of said received data, and appending said second file to an end of said first file, and wherein both said first and second data files are created without interactive operator intervention; and, b) access means, coupled to said first and second data file, for providing electronic access to and use of said first and second data file by any authorized user or group of users.

7. The system according to claim 6 further including notification means coupled to said data file creating means, for notifying a particular user or group of users of said first and second data files created.

8. The system according to claim 6 wherein said access means includes browse means for allowing visual review of said received data in said first and second data files.

9. The system according to claim 6 wherein said access means includes modify means for allowing said received data in said first and second data files to be modified.

10. The system according to claim 6 wherein said access means includes reject means for allowing the rejection of all or part of said received data in said first and second data files.

11. The system according to claim 6 wherein said access means includes approval means for allowing the approval of all or part of said received data in said first and second data files.

12. The system according to claim 6 wherein said access means includes report means for allowing reporting of said received data in said first and second data files.

13. A method of managing Electronic Data Interchange (EDI) between a sending trading partner and a receiving trading partner, comprising the steps of:

a) receiving data from said sending trading partner, said received data containing, selectively, standard EDI structured data and non-standard EDI data, and said non-standard EDI data having a structure substantially similar to a standard EDI data structure, and said non-standard EDI data or an identifier associated with said non-standard EDI data being corrupted before being received;

b) comparing said structure of said non-standard EDI data received to a library of standard EDI data structures, and identifying a standard EDI data structure in said library most similar to said structure of said received data;

c) assigning to said received data a structure definition the same as said standard EDI data structure in said library compared to be most similar to said structure of said received data;

d) creating a first data file having a predefined template format for managing any of said received data that conforms to said template format, said first file created from a merging of received data that conforms to said template format into data fields of said template format; and e) creating a second data file for managing any of said received data that does not conform to said template format, said second file created from a transfer of said data to said second file without any template format interpretation of said received data, and appending said second file to an end of said first file, and wherean both said first and second data files are created without interactive operator intervention.

14. The method according to claim 13 further including notifying a particular user or group of users of said first and second data files created.

15. The method according to claim 13 further including providing access to and use of said first and second data files by any authorized user or group of users.

* * * * *